Patented Mar. 12, 1946

2,396,586

UNITED STATES PATENT OFFICE 2,396,586

COPOLYMERS OF CARBOALKOXY ALKYL ACRYLONITRILES

John R. Long, Stow, Ohio, assignor to Wingfoot Corporation, Akron, Ohio, a corporation of Delaware No Drawing. Application June 16, 1943,
Serial No. 491,055

11 Claims. (Cl. 260—84.5)

This invention relates to interpolymers of butadiene and certain substituted acrylonitriles. More particularly, it relates to copolymers of butadienes and carboalkoxy alkyl acrylonitriles.

It is well known that aliphatic conjugated dienes, such as butadiene-1,3; isoprene; 2,3-dimethyl butadiene-1,3; piperylene and the like, may be copolymerized with other monomers to yield plastic masses which display the general properties of rubber when appropriately treated. It has now been found that these aliphatic conjugated dienes may be copolymerized or interpolymerized with certain substituted acrylonitriles to produce plastic compositions which may be useful in place of rubber for certain purposes, or may be useful as resins in the preparation of sheets, coatings, and the like.

The substituted acrylonitrile, constituting one ingredient of the plastic composition, may be prepared in accordance with methods set forth in copending application, Serial #405,998, filed August 8, 1941, of which this application is a continuation in part. The substituted acrylonitriles are the carboalkoxy alkyl acrylonitriles, particularly the alpha (omega carboalkoxy alkyl) acrylonitriles, for example, the alpha (omega carboalkoxy ethyl) acrylonitriles, and the alpha (omega carboethoxy alkyl) acrylonitriles.

These compounds may be obtained in a series of steps starting with a keto acid ester of the general formula $CH_3-CO(CH_2)_xCOOR$, where $x$ is zero or an integer and R is an ester-forming group, those esters being preferred in which the acid contains not more than four methylene groups. Also, while R may be any ester-forming group, the alkyl esters, such as the methyl, ethyl, and propyl esters, are preferred, particularly the methyl esters.

In the preparation of the compounds, the keto acid ester, such as methyl pyruvate, is treated with hydrogen cyanide, usually in the presence of sodium cyanide or a similar catalyst. When the HCN gas has been absorbed in an amount corresponding to the molecular equivalent of the ester, or more or less, as may be desired, the mixture is permitted to stand. Preferably the temperature should be kept in the neighborhood of 40–50° C. during the addition of the hydrogen cyanide. The cyanhydrin so formed may be separated or the mixture may be subjected to the next step without such separation. In the next operation, an acetylating agent, such as acetic anhydride in the presence of sulfuric acid, is employed, the cyanhydrin being added to the acetylating agent while maintaining the temperature at about 100–110° C., although the temperature may be varied as indicated by the course of the reaction. The cyanhydrin acetate is formed in this step and this product may be recovered by filtering off solids and distilling to remove acetic acid. Further purification may be required, as by distillation under a higher vacuum.

The cyanhydrin acetate obtained by the foregoing procedure may then be pyrolyzed by heating in a furnace at a temperature of 535–550° C., or other suitable temperatures, usually between 500–600° C. The vapors leaving the furnace are cooled and then distilled in the presence or absence of a polymerization inhibitor, such as hydroquinone. The product may be termed an ester of a cyano acid or a carboalkoxy nitrile and is obtained as a polymer or as a monomer. Of course, the procedure outlined for the pyrolysis may be employed with modifications in the pyrolysis of other cyanhydrin acetates.

The reactions involved in the preparation proceed as follows:

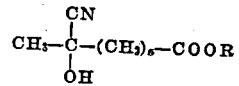

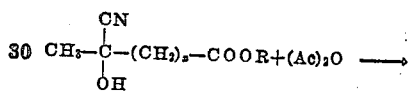

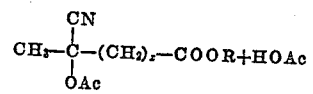

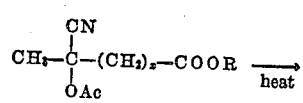

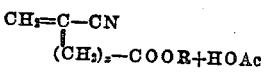

and

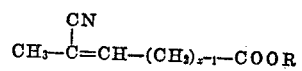

To illustrate one means of preparing the compounds, the following examples are given, although it will be understood that no limitation is intended thereby.

*Example 1.—Cyanhydrin acetate of methyl levulinate*

Into 545 grams of methyl levulinate,

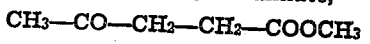

was passed hydrogen cyanide gas, in the presence of 3.0 grams of NaCN until the weight had increased 114 grams. The reaction mixture was kept at a temperature of 40–50° C. during the addition of the HCN. The reaction mixture was allowed to stand overnight and was then added slowly, with shaking, to a mixture of 483 grams of acetic anhydride and 5.5 grams of $H_2SO_4$ kept at a temperature of 100–120° C. This temperature was maintained for a half hour after the addition was completed. The acetic acid generated was distilled off with the aid of a waterpump and the product residue distilled on an oil pump. The substance distilling between 115–130° C. under a pressure of 2 mm. was taken to be the cyanhydrin acetate of methyl levulinate having the formula

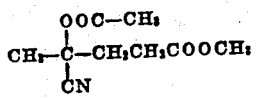

The nitrogen analysis was as follows: % N Obs.= 7.30, 7.28; Calc. 7.05. The index of refraction was $n_D^{25}=1.4400$; the density was $d_{27}=1.1170$.

*Example 2.—Alpha (beta carbomethoxy ethyl) acrylonitrile*

The compound prepared in Example 1, the cyanhydrin acetate of methyl levulinate, was passed through a pyrolysis chamber consisting of a 25 mm. (i. d.) Pyrex tube filled with clay saddles. The tube was heated to a temperature of 565–585° C. in a 2½ foot vertical wire-wound electric furnace. The vapors, on leaving the furnace, were cooled by passing them through a water condenser. In the course of 2½ hours 468 grams of the cyanhydrin acetate was passed through the pyrolysis tube at a pressure of 30–35 mm. The crude product was fractionated under reduced pressure to obtain a main fraction distilling at 80–85° C. The product was probably alpha (beta carbomethoxy ethyl) acrylonitrile having the formula:

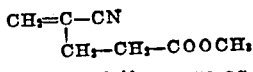

Its physical characteristics were as follows:

$n_D^{26}=1.4478$; $d_{27}=1.0352$. % N: Found 9.8, 9.9; Calc. 10.07. An isomeric substance may also be present having the formula:

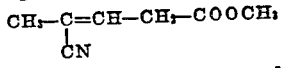

but, if so, it had so nearly the same boiling point that no separation occurred upon distillation.

Other carboalkoxy alkyl acrylonitriles can also be prepared by the above-described procedure, and may be employed in the preparation of copolymers. Among these may be mentioned alpha (carbomethoxy methyl) acrylonitrile, alpha (gamma carbomethoxy propyl) acrylonitrile, alpha (delta carbomethoxy butyl) acrylonitrile, and alpha (carboethoxy ethyl) acrylonitrile.

To illustrate the procedure followed in preparing interpolymers of these substituted acrylonitriles with a diene hydrocarbon, the following example is given, the actual procedure employed not being limited to the details set forth.

*Example 3.—Copolymer with butadiene*

The polymerizing properties of the compound obtained in Example 2 were tested by polymerizing the same with butadiene. A mixture of 9.6 grams of butadiene and 6.4 grams of alpha (beta carbomethoxy ethyl) acrylonitrile was emulsified in 20 cc. of an aqueous solution containing 0.366 gram of sodium perborate, the aqueous solution being made up of 10 cc. of McIlvaine's buffer (phosphate-citrate) giving a hydrogen ion concentration of pH=4.1 and 10 cc. of 6% Duponol (Na "Lorol" sulphate) as an emulsifier. The emulsion was agitated for a period of 42 hours at a temperature of 30° C. Thereafter, the polymer was coagulated with alcohol, washed and dried, a yield of 9.25 grams of a soft copolymer being obtained.

Various methods of polymerization may be employed in the preparation of the above, or by way of modification thereof. However, the most efficient and preferred method is to carry out the reaction in an aqueous emulsion. In this process, the mixture of monomers is emulsified with water by means of a suitable emulsifying agent, an oxidant, a catalyst, and other substances which influence the polymerization in the desired manner. The emulsion is continuously agitated and the temperature is maintained between about 30° and 80° C. until the reaction has proceeded to the desired degree, usually a matter of several hours, although sometimes a few days are necessary.

Among the materials which may be used as emulsifiers in the above process may be mentioned sodium or potassium salts of fatty acids, e. g., sodium oleate and sodium palmitate, or synthetic soap-like materials, such as aromatic and/or aliphatic sulphonates and sulphates, e. g., sodium lauryl sulphate, sodium naphthalene sulphate, etc.

Among the polymerization accelerators which may be used are the organic and inorganic peroxides such as hydrogen peroxide and benzoyl peroxide or per salts, such as alkali metal perborates and persulphates.

The monomers may be present in various proportions, as required for a plastic of the desired properties, but usually each monomer will be present in the mixture to the extent of at least 20%. Preferably, however, the mixture will contain at least 50% or 60% by weight of the diene, such as butadiene-1,3 and, correspondingly, up to 40 or 50% by weight of the acrylonitrile compound. The foregoing proportions are based on the total weight of monomers undergoing polymerization.

Representative copolymers which may be obtained by the practice of the invention are butadiene-1,3+alpha (beta carbomethoxy ethyl) acrylonitrile, isoprene+alpha (beta carbomethoxy ethyl) acrylonitrile, butadiene-1,3+alpha (carbomethoxy methyl) acrylonitrile, and isoprene+alpha (carbomethoxy methyl) acrylonitrile.

While there has been described above a preferred embodiment of the invention, it will be apparent to those skilled in the art that various modifications and changes may be made therein without departing from the spirit of the invention or from the scope of the appended claims wherein it is intended to cover all features of patentable novelty residing in such invention.

I claim:

1. A copolymer of an aliphatic conjugated diene hydrocarbon and an alpha (omega carboalkoxy alkyl) acrylonitrile.

2. A copolymer of an aliphatic conjugated diene hydrocarbon and an alpha (omega carboalkoxy ethyl) acrylonitrile.

3. A copolymer of an aliphatic conjugated diene hydrocarbon and an alpha (omega carbomethoxy alkyl) acrylonitrile.

4. A copolymer of a conjugated hydrocarbon butadiene and an alpha (omega carboalkoxy alkyl) acrylonitrile.

5. A copolymer of a conjugated hydrocarbon butadiene and an alpha (omega carboalkoxy ethyl) acrylonitrile.

6. A copolymer of a conjugated hydrocarbon butadiene and an alpha (omega carbomethoxy alkyl) acrylonitrile.

7. A plastic mass obtained by the interpolymerization of about 60% to 80% of a conjugated hydrocarbon butadiene and about 40% to 20% of an alpha (omega carboalkoxy alkyl) acrylonitrile.

8. A copolymer of butadiene-1,3 and alpha (omega carbomethoxy ethyl) acrylonitrile.

9. A plastic mass obtained by the interpolymerization of about 60% to 80% of butadiene-1,3 and about 40% to 20% of alpha (omega carbomethoxy ethyl) acrylonitrile.

10. A copolymer of butadiene-1,3 and alpha (omega carboethoxy ethyl) acrylonitrile.

11. A plastic mass obtained by the interpolymerization of about 60% to 80% of butadiene-1,3 and about 40% to 20% of alpha (omega carboethoxy ethyl) acrylonitrile.

JOHN R. LONG.